US009122526B2

(12) United States Patent
Overbeck

(10) Patent No.: US 9,122,526 B2
(45) Date of Patent: *Sep. 1, 2015

(54) DYNAMIC PROGRAM EVALUATION FOR SYSTEM ADAPTATION

(71) Applicant: Apple Inc., Cupertino, CA (US)

(72) Inventor: Charles R. Overbeck, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/527,622

(22) Filed: Oct. 29, 2014

(65) Prior Publication Data

US 2015/0082315 A1    Mar. 19, 2015

Related U.S. Application Data

(63) Continuation of application No. 13/855,608, filed on Apr. 2, 2013, now Pat. No. 8,893,088.

(51) Int. Cl.
*G06F 9/44* (2006.01)
*G06F 9/48* (2006.01)
*G06F 9/445* (2006.01)
*G06F 1/32* (2006.01)

(52) U.S. Cl.
CPC ............... *G06F 9/4893* (2013.01); *G06F 1/32* (2013.01); *G06F 1/3206* (2013.01); *G06F 1/329* (2013.01); *G06F 9/44536* (2013.01); *G06F 9/44547* (2013.01)

(58) Field of Classification Search
CPC .................................................. G06F 9/4893
See application file for complete search history.

(56) References Cited

U.S. PATENT DOCUMENTS

| 5,787,285 | A | 7/1998 | Lanning |
| 7,065,754 | B1 | 6/2006 | Coutant et al. |
| 7,290,246 | B2 | 10/2007 | Cyran et al. |
| 7,543,282 | B2 * | 6/2009 | Chou ............................ 717/151 |
| 7,716,500 | B2 * | 5/2010 | Esliger ......................... 713/300 |
| 7,904,893 | B2 | 3/2011 | Munter et al. |

(Continued)

OTHER PUBLICATIONS

PCT International Search Report and Written Opinion of the International Searching Authority for PCT/US2014/025009 mailed Jul. 7, 2014.

(Continued)

*Primary Examiner* — Philip Wang
(74) *Attorney, Agent, or Firm* — Blakely, Sokoloff, Taylor & Zafman LLP

(57) ABSTRACT

A method and apparatus to maintain a plurality of executables for a task in a device are described. Each executable may be capable of performing the task in response to a change in an operating environment of the device. Each executable may be executed to perform a test run of the task. Each execution can consume an amount of power under the changed operating environment in the device. One of the executables may be selected to perform the task in the future based on the amounts of power consumed for the test runs of the task. The selected one executable may require no more power than each of remaining ones of the executables.

22 Claims, 7 Drawing Sheets

(56) References Cited

U.S. PATENT DOCUMENTS

| | | | |
|---|---|---|---|
| 8,255,723 B2* | 8/2012 | Rozen et al. | 713/323 |
| 2001/0042243 A1 | 11/2001 | Fish et al. | |
| 2003/0191976 A1 | 10/2003 | Cyran et al. | |
| 2004/0015571 A1* | 1/2004 | Miyazaki et al. | 709/220 |
| 2005/0229149 A1 | 10/2005 | Munter et al. | |
| 2007/0220293 A1* | 9/2007 | Takase | 713/320 |
| 2008/0059814 A1* | 3/2008 | Esliger | 713/300 |
| 2009/0319988 A1 | 12/2009 | Teranishi et al. | |
| 2010/0205578 A1 | 8/2010 | Barness et al. | |
| 2010/0299661 A1 | 11/2010 | Citron et al. | |
| 2011/0154309 A1* | 6/2011 | Sazegari et al. | 717/153 |
| 2014/0181970 A1* | 6/2014 | Belov | 726/23 |

OTHER PUBLICATIONS

Hsu, C.H. et al., "A Power Aware Run Time System for High Performance Computing," Proceedings of the 2005 IEEE/ACM Conference on High Performance Computing, Networking and Storage [online], 2005 [retrieved Aug. 10, 2012], Retrieved from Internet: http://sss.cs.vt.edu/pubs/sco5.pdf, pp. 1-9.

Unnikrishnan, G., et al., "Dynamic Compilation for Energy Adaptation," Processing of the 2002 IEEE/ACM International Conference on Computer-Aided Design [online], 2002 [retrieved Aug. 10, 2012], Retrieved from Internet: http://dl.acm.org/ft_gateway.cfm?id=774595&ftid=146312&dwn=1&CFID=102423540&CTFOKEN=94891861, pp. 158-163.

* cited by examiner

DYNAMIC PROGRAM EVALUATION FOR SYSTEM ADAPTATION

This application is a continuation of U.S. application Ser. No. 13/855,608 filed on Apr. 2, 2013.

FIELD OF INVENTION

The present invention relates generally to system adaptation. More particularly, this invention relates to performing dynamic program evaluations to adapt a system to its current operating environment.

BACKGROUND

Multiple versions of source codes may be authored to perform the same function with different considerations. For example, an author may code a library routine for a common data processing task or function, such as graphic rendering routine, to produce separate source codes, based on, for example, different algorithms or optimization parameters etc. Each source code can be compiled into a separate executable as a different implementation to perform the common task.

As system may be installed with a library including theses multiple implementations of the common task (or a library routine), it is not uncommon to require manual configurations to specify which one of the executable codes should be used for the system. However, with the increase of complexity of modern data processing systems, manual configurations have become too tedious to be practical.

Further, a programmer may provide multiple versions of source codes for implementing a same task without considering all possible variations in actual operating environments where these codes will be executed. In fact, it may be increasingly difficult or even impossible to take all relevant variations in actual operating environments into considerations when designing the code.

Therefore, current approaches for a system to adapt to actual operating environments are impractical, not comprehensive and not optimized.

SUMMARY OF THE DESCRIPTION

In one embodiment, dynamic program evaluation can test run multiple variations of executables to select one or more executables suitable for current runtime environment of a system. Each executable may be capable of performing a common task. The executables may be evaluated via test runs during runtime to generate sensor data measuring performance related information. One or more executables may be selected based on the sensor data collected. The evaluation may be automatically triggered by changes detected in hardware/software runtime environments of the system. In one embodiment, dynamic executable adaptation can allow a developer to select between a maximum performance or a maximum efficiency via a runtime evaluation. Dynamic evaluation of executables (e.g. functions and programs) based on hardware power measurements can intelligently configure the system to save power or improve other applicable system performance metrics or attributes.

An embodiment of the present invention includes a method and apparatus to maintain a plurality of executables for a task in a device. Each executable may be capable of performing the task in response to a change in an operating environment of the device. Each executable may be executed to perform a test run of the task. Each execution can consume an amount of power under the changed operating environment in the device. One of the executables may be selected to perform the task in the future based on the amounts of power consumed for the test runs of the task. The selected one executable may require no more power than each of remaining ones of the executables.

In an alternative embodiment, a change in an operating environment of a machine may be detected. The machine can include a plurality of executables for a task. Each executable may be capable of performing the task. In response to the change detected, test runs of the executables on the machine may be performed to measure suitability of the executables to perform the task under the operating environment. One of the executables may be selected based on the measured suitability. The selected one executable may be executed in response to future requests to perform the task without performing the remaining executables.

In an alternative embodiment, an executable code may be loaded for performing a data processing routine. The executable code can include two or more execution paths. Each execution path may be capable of performing the data processing routine. The executable code may be associated with a sample input for the data processing routine. In response to the loading, each execution path may be executed to perform the data processing routine with the sample input. Each execution path may be executed to consume a separate amount of processing resource (e.g. power) in the machine. The executable code may be dynamically configured, for example, in response to the loading, to enable one of the execution paths for the data processing routine based on an amount of processing resource consumed. The one execution path configured may consume no more amount of processing resource than the remaining execution paths. The configuration may disable the remaining execution paths in the executable code for the data processing routine.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
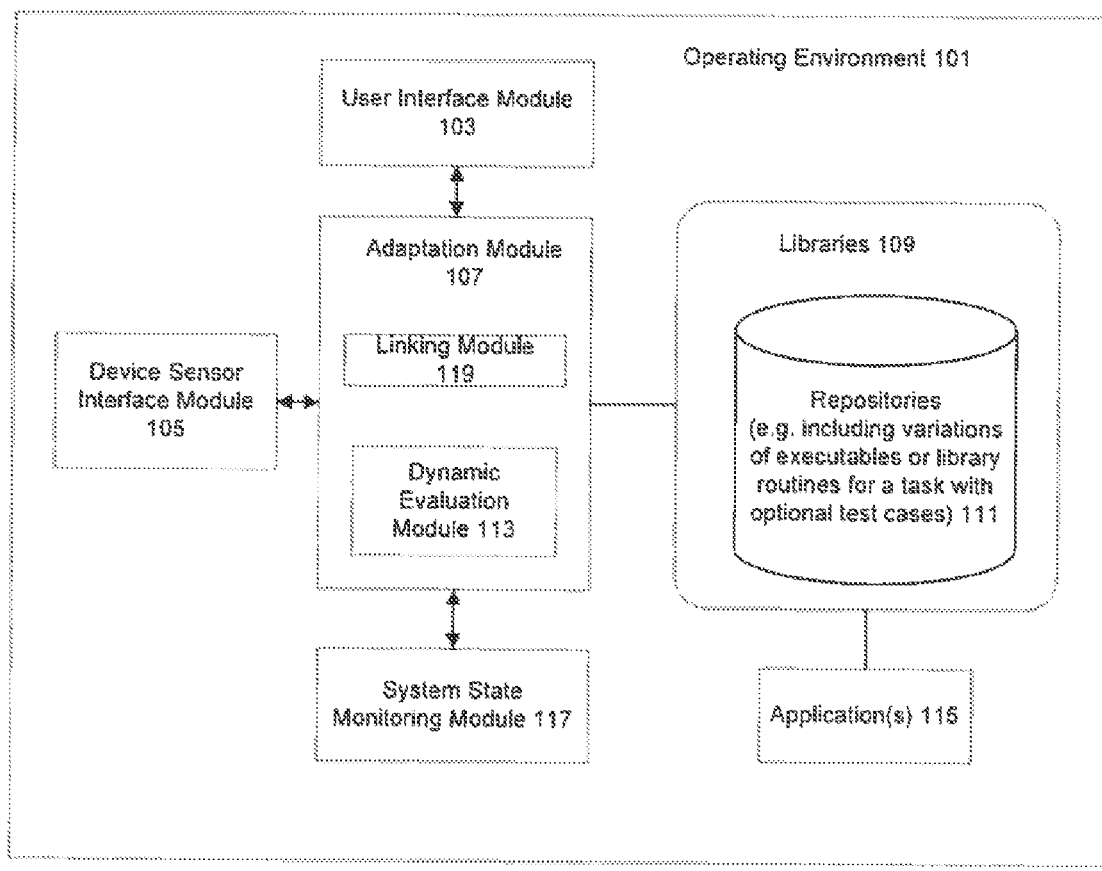
FIG. 1 is a block diagram illustrating one embodiment of system components for dynamic adaptation.

A method and an apparatus for dynamic program evaluation are described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

In one embodiment, dynamic program evaluation can allow a system to configure which available executables to perform a task in the near future based on the current runtime environment to improve certain system measures. For example, the system may include multiple versions or varieties of executables, each is capable of performing the same task. A current executable may have already been designated to be activated to perform a task, for example, via application programming interface call from an application.

In one embodiment, dynamic program evaluation may be triggered to evaluate each executable or a selected set of the available executables to determine which one(s) should be designated for performing the task when called or requested. Thus, the rest of the executables which are not selected or designated may not be executed (e.g. not activated or loaded) for the system to perform the corresponding task.

In some embodiments, dynamic program evaluation may cause evaluation test runs on a group of executables for performing a task. Each one of the executable or selected ones may be executed with test cases and corresponding system measures may be collected and compared, e.g. via hardware sensors. System measures may include power consumption, processing speed, memory usage, elapsed time and/or other applicable measures.

A system may aggregate multiple executables, each executable capable of performing the same task. During runtime, one of the executables may be activated to perform the task, e.g. via a common API (application programming interface) from an application. Test cases for the task may be provided together with the multiple executables. Each executable may be compiled from a different source code for accomplishing the same task using a separate method or a variation of method (e.g. different algorithms, different implementations, etc.) Thus, multiple executables may provide an opportunity for a system to choose different options to accomplish the task at different instances of time.

In certain embodiments, dynamic program evaluation can perform evaluation runs on available executables to decide which is the most power efficient to perform a task on a particular machine in the future. Each of the executables can represent a different option or an alternative routine to performing the same task. The runtime evaluation can effectively enlist all factors (e.g. hardware or software) that may affect the result of the evaluation. These factors may not be available or be considered when the corresponding codes (or source codes) for the executables were designed or authored. Exemplary factors may include platforms (e.g. different processors, circuit boards, buses, operating systems etc.), system configurations, environmental settings (e.g. networking environments, temperatures, etc.) or other applicable runtime processing factors.

In some embodiments, a subset of available executables for a data processing task may be selected for evaluation instead of conducting test runs on all available executables. The subset of executables may be dynamically determined and/or fine tuned. For example, a record or history of evaluation results may be maintained. Each available executable may be ranked according to previous (e.g. latest) test results (based on a certain criteria, such as power usage). The subset of available executables to be evaluated may be identified as a portion (e.g. top 3, top 25% etc.) of the available executables according to the ranked order. Thus, the number of test runs required may be continuously adjusted (or tuned) according to, for example, current runtime environment without the need to test run each available executable every time.

In some embodiments, impacts to user experience may be monitored to schedule dynamic program evaluation when triggered. For example, dynamic execution evaluation may be performed in the background invisible to a user during the time periods when the system is idle. Dynamic adaptation may be stopped and resumed (e.g. when detecting the system being idle) until each scheduled test run is completed. Thus, a short period of time (e.g. 20 ms) required to test run selected executables may be performed separately in multiple (e.g. non-consecutive) periods of time interval (e.g. 5 ms each) when certain run time conditions are satisfied, such as system idling without processing user related tasks or other applicable high priority tasks.

In one embodiment, a system can dynamically generate or select test cases based on which tasks have been performed recently (e.g. in the last invocation of the corresponding API or other calls from applications). An executable configured or installed in the system may be associated with one or more test cases which may be applied to execute the executable for evaluation.

In some embodiments, precompiled test cases may be provided as particular fixed inputs to be applied at evaluation time for selecting executables, for example, to provide a library service to performing a data processing task. Same or similar tests may be conducted for each executable to perform the same task to collect performance data (e.g. time spent, processing cycles consumed, power used etc.) via hardware sensors. Firmware capable of dynamic program evaluation may automatically pick a best available executable (e.g. based on a certain algorithm) to perform the task in response to environmental changes detected or based on user configured schedule.

Test cases used to test run an executable for a processing task may be predetermined and/or dynamically decided. In one embodiment, dynamic program evaluation may select one or more real cases (or inputs) previously performed for the task to test run different variations of executables. In one embodiment, dynamic program evaluation may use the last real input case (e.g. a graphic frame) for the processing task (e.g. frame decoding task) instead of using a predetermined test cases (e.g. a test graphic frame) associated with the executables. Determining which test cases for test running executables may depend on user configurations, runtime hardware/software environments, availability of predetermined test cases or other applicable runtime factors.

In one embodiment, executables may have dependency relationships among each other. For example, a first executable may depend on a second executable if the first executable includes the second executable (e.g. calling the second executable). Dynamic program evaluation may test run the executables via the dependency relationships in a bottom up manner to select a combination or configuration of dependent executable. The selection may be based on overall cost or measures aggregated from multiple executables from lower levels up via the dependency relationships.

In one embodiment, dynamic executable adaptation may select executables based on optional configurations via, for example, a user interface. The configurations may specify which libraries to evaluate, when to perform dynamic evaluation, and/or which executable to use based on certain conditions without a need to perform a test run for evaluation. A user configuration may include a list of events to be monitored, which executable to consider or exclude for dynamic executable adaptation.

For example, a user may specify one executable for a graphic processing task when a system is attached with a specific graphic card. The configurations may allow a user to pick certain executables to be included in the evaluation run and/or adopted without a need to run evaluation test. User inputs may provide constrains on which executables can or cannot be selected during dynamic adaptation.

In one embodiment, executables for performing an OpenGL (open graphics library) task may be selected based on whether a graphics card (or other applicable hardware device) is integrated within a system or coupled externally to the system. Because of complication in performing the OpenGL related tasks (or other applicable tasks), power consumption on running the same routine (or executable) may differ based on input parameters and/or hardware platforms.

During system initialization, dynamic program evaluation can determine whether the system includes an internal graphics card (or other applicable hardware component) or an external graphics card. Dynamic program evaluation may test run executables using default test cases (e.g. associated with the executables) during system initialization for selecting executables, for example, to configure an OpenGL library or other applicable system software installed in the system. Dynamic program evaluation may test run executables using actual custom data to further fine tune the selection.

In one embodiment, multiple components may be dynamically linked or integrated together for an API call to perform a task, such as frame decoding or memory allocation (e.g. malloc( )). Related components to perform a task may be stored in a register, a table or other applicable data structures. Each component (executable) may be evaluated (or executed) separately. Selection may be based on a combination of each of the evaluation results. For example, the combination may correspond to total energy consumed or total time spent for the performing the task during test runs using test cases.

In some embodiments, executable evaluation for dynamic program evaluation may depend on processing resources available in a device. The evaluation may include tradeoffs such as the amount of resources saved in future executions by a desired executable vs. amount of resources required to conduct the evaluation. In one embodiment, determining whether and/or when to conduct dynamic and progressive dynamic adaptation may depended on the number of executables (or routines) to evaluate, amount of resources required to test run each executable, how often or how many times the associated task of the executables is expected to be performed, and/or other applicable measures.

In one embodiment, dynamic program evaluation can occur during system changes (e.g. via configuration, booting, driver loading, network connections or other applicable environmental changes etc.) to cause slight delay in responses to user commands during executable evaluations. Subsequently, the adapted system can perform data processing tasks in an improved mode (e.g. better power usage, more efficient execution, better memory utilizations etc.) according to criteria employed for the adaptation.

Executable evaluation or selection may be trigged dynamically based on events caused by changes in computing environments. For example, computing environments can include hardware environments which can be changed caused by when an external USB device is connected/disconnected to/from a USB (Universal Serial Bus) port of the system; when a Ethernet cable is plugged/unplugged into/from an Ethernet connector of the system, when an external power source is plugged in/out, or when a power source is switched to another power source (internal or external), etc. Alternatively or additionally, loading/unloading software drivers (e.g. between a memory and a non-volatile storage device) may indicate occurrence of change in computing environments.

In one embodiment, which events can trigger dynamic executable selection or re-linking may be configured or scheduled via a user interface. In certain embodiments, processing load of a system may be monitored to determine when to perform dynamic executable selection or re-linking such that the performance impact on the system can be minimized. For example, when a system is detected as being idle (or in an idle state with processing load lower than a certain threshold (predetermined or dynamically determined), an evaluation process can be started or resumed. The evaluation process may be stopped (temporarily) when, for example, a task of higher priority is requested or started.

Alternatively or optionally, executable selection or re-linking may be triggered during system initialization and/or when drivers or other software modules are loaded (e.g. from a disk or other storage to a memory for execution). In some embodiments, executable re-linking in dynamic program evaluation may update a pointer to a selected executable for implementing a data processing task. When a corresponding API for the task is called in the future, the updated pointer may be followed to activate or executed the selected executable to perform the task.

In one embodiment, dynamic program evaluation may include collecting sensor data via a microcontroller in a device. The microcontroller may include a power sensor (or other applicable hardware sensor) which may be controllable via software. A hardware sensor may provide measurable data for a sufficiently complicated processing task (e.g. performed in milliseconds instead of nanoseconds). Measurable data sensed may include current, voltage, elapsed time, the presence or absence of one or more peripheral devices, etc. or other applicable sensed data. System kernel (core system software) may be capable of communicating with the microcontroller to coordinate with task scheduling (when to start, stop, resume etc.) to allow multiple tasks and/or hardware sensors to be monitored at the same time. Sensor data dumped from the microcontroller can be accurately attributed to corresponding tasks and/or sensors via the kernel. For example, a processor (e.g. CPU, GPU, etc) and a peripheral device (e.g. USB device, network card or other devices) may be measured (e.g. based on battery power usage or other sensed data) at the same time for different tasks performed in parallel.

In one embodiment, instructions to start/stop power sensing may be sent from a user program or directly from a user interface. Power consumption for each routine may be measured to select the most energy efficient one for future execution for a task. Each of these routines may be applicable for certain types of devices (or machines), e.g. based on hardware platforms (e.g. types of processors) or software platforms (e.g. operating systems). The device can automatically identify which ones are compatible and select the most efficient one under current runtime environments.

In some embodiments, a sensor system controller can provide an interface to enable system level or application level control on collecting sensor data from different portions of a device (e.g. CPU power usage, battery power usage etc.) at different times. The interface may allow sensor data collection to, start, stop, reset, switch out, or put back in (e.g. for accumulating the data). Thus, a data processing task can be broken up into pieces at different time interval without a need to occupy a continued time interval for sensor data collection.

Dynamic program evaluation can leverage the sensor system controller to allow an operating system (or other system components) to determine which algorithms or corresponding executables are most applicable to be executed for a task under current runtime environments. The decision may be based on certain system measurement criteria such as minimizing power usage, maximizing processing performance, or maximizing processing efficiency etc.

FIG. 1 is a block diagram illustrating one embodiment of system components for dynamic adaptation. System 100 may include an operating environment 101, such as, for example, in an iPhone operating system for a cell phone device or a Macintosh OS X operating system for a desktop. In one embodiment, operating environment 101 may be configured with libraries 109 including executables (or routines, programs) to perform system or application level tasks. Libraries 109 may be, for example, dynamically configured or loaded into operating environment 101 from a storage device (hard drive, flash memory or other non-volatile storage devices) coupled to system 100. One or more user level and/or system level applications 115 may be linked with libraries 109 to call library routines inside library 109 to perform a desired task, e.g. via API calls.

In one embodiment, libraries 109 may include executable repositories 111 with variations of executables, each already compiled to perform a common task. For example, different executables (or program routines) may be written by the same author with different preferences, performance priority (speed, memory usage, power usage etc.), development tool constrains, hardware configurations, system platforms, and/or other applicable criteria. Each executable can be executed to perform the same task with different performance and/or resource usage implications at different runtime state of system 100. Libraries 109 may store pointers to actual executables which can be dynamically loaded from a coupled storage device.

A runtime state may include hardware and/or software environments of system 100 at a point in time. Hardware environments may be determined based on network connections, power sources, peripheral devices, or other physical components/configurations. Software environment may depend on the tasks being performed, currently active executables (programs), drivers supported, system configurations, and/or other applicable program runtime statuses.

In one embodiment, adaptation module 107 may dynamically configure libraries 109 to specify or designate which among executable repositories 111 should be executed, for example, when requested by applications 115. Adaptation module 107 may include linking module 119 which is capable of performing dynamic linking/relinking (without recompiling), for example, to switch a pointer or program address to the designated executable to perform a task. Applications 115 may not be aware of which executable inside library 109 is actually called when making a request (e.g. insulated by an API call). A portion (or one) of available executables in repositories 111 may be loaded (or linked) via an API call from applications 115.

Adaptation module 107 can include dynamic evaluation module 113 to perform evaluation test runs on executables in libraries 109. In certain embodiments, executables in repositories 111 may be associated with test cases for evaluation test runs. The test cases may be packaged together with the executables. For example, an author of the original source code (or other applicable test case generation mechanisms) for an executable compiled from the source code to perform a task (e.g. frame decoding or other applicable functions, routines etc.) may provide a corresponding test case (e.g. as sample inputs) for the executable to perform the task.

Alternatively or optionally, test cases may be dynamically determined. For example, a history of actual cases (or inputs) for performing a task may be recorded or logged. In one embodiment, the last actual case requested to perform a task may be used to conduct evaluation tests on multiple variations of executables to perform the task. Multiple executables may be evaluated to perform one task based on one single test case substantially at the same time (e.g. during a similar runtime environment).

In one embodiment, dynamic evaluation module 113 may select all or a portion of available executables in executable repositories 111 for evaluation test runs. For example, dynamic evaluation module 113 may iterate through all available executables for test runs if the processing resource (e.g. processor or memory usage) load is below a certain threshold. In certain embodiments, dynamic evaluation module 113 may keep a history or a record of results from previous test runs. When the processing resource load is above a certain level, dynamic evaluation module 113 may test run a portion of the executables ranked higher according to certain selection criteria than the other portion of the executables in previous test runs (e.g. latest test run or a statistical combination, such as average, medium, etc. of multiple test runs).

A test run of an executable may be performed within one time interval or spread out into separate non-overlapping time intervals allocated for the test run in one or more processor. During the test run, sensor data may be collected via device sensor interface module 105. For example, adaptation module 107 may notify device sensor interface module 105 when to start, stop, resume, reset or collect sensor data for a particular test run. Sensor data may be based on measurements from hardware sensors in a device housing system 100.

For example, a device housing system 100 may include an application processor and a System Management Controller (SMC). SMC can include one or more sensors that monitor one or more of temperatures, voltages, currents, fans, power supplies, bus errors, system physical security and any other metrics or data that could be used to detect or predict system function or performance. For example, application processor could become overheated while running an application. Sensors can be located anywhere in the device housing system 100.

Results of a test run may be represented via corresponding system measurements or metrics including sensor data collected from hardware sensors, such as elapsed time, power usage, processor temperatures, voltages, currents, or other applicable measured data). In some embodiments, an executable may include (or call) one or more separate executables to form a directed, parent-child or ancestor-offspring relationships. An executable may correspond to an execution path (e.g. via parent-child relationship) of multiple child executables. Adaptation module 107 may determine a test result for one executable by aggregating test results from its corresponding child executables, for example, in a bottom-up manner.

Adaptation module 107 may use selection criteria to select executables based on metrics representing results of test runs or actual runs. Selection criteria may be based on maximum performance, minimum power usage, minimum memory usage or other applicable measurements or constraints. Adaptation module 107 may select an executable to perform a task for a future request based on the results of test runs. Optionally, adaptation module 107 may select a portion of executables to perform test runs based on actual runs (e.g. using custom cases from applications 115) or test runs (e.g. using test cases associated with the executables).

Adaptation module 107 may dynamically determine whether to trigger dynamic evaluation module 113 to conduct test runs on executables to configure or re-configure system 100, including library 109. For example, system state monitoring module 117 can monitor or observe runtime states in operating environments of system 100. System state monitoring module 117 may notify adaptation module 107 with detected changes in the runtime states, such as when a USB device is connected, disconnected, when an external power source is changed, discontinued, or connected, when a peripheral device (e.g. a graphics card, network card) is attached, when a driver for a peripheral device is loaded/unloaded, when system boots up, and/or other applicable runtime state changes.

In some embodiments, user interface module 103 may allow a user to customize or control adaptation module 107 to configure system 100. For example, user interface module 103 may specify which executables should be selected, considered (i.e. included as a candidate for test runs), or excluded for evaluation test runs by dynamic evaluation module 113. Additionally or optionally, adaptation module 107 may be constrained via user interface module 103 on which runtime events (e.g. system initialization, booting, changes of operating environments) and/or which sensor data to be included/excluded for performing test runs to configure system 100. In one embodiment, a user may directly command adaptation module 107 to start/stop specific test runs for certain tasks (e.g. functions, programs, APIs, system services etc.)

Figure 2:
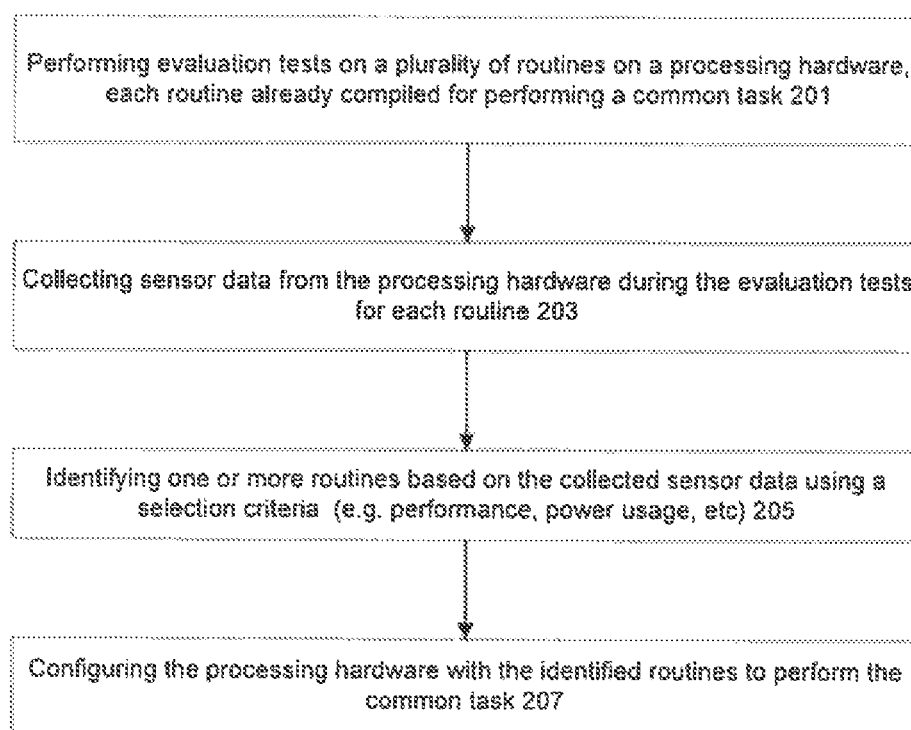
FIG. 2 is a flow diagram illustrating an embodiment of a process to perform evaluation runs on routines to configure a hardware.

FIG. 2 is a flow diagram illustrating an embodiment of a process to perform evaluation runs on routines to configure a hardware. Exemplary process 200 may be performed by a processing logic such as system 100 of FIG. 1. At block 201, the processing logic of process 200 can perform evaluation tests on a plurality of routines, such as executables in repositories 111 of FIG. 1, on a processor hardware, such as a processing device housing system 100 of FIG. 1. Each routine may have already been compiled and/or linked for performing a common task. In one embodiment, each routine can produce a common result when performed with a common input.

At block 203, the processing logic of process 200 can collect sensor data from the processing hardware during the evaluation tests for each routine. Multiple evaluation tests may be performed sequentially or in parallel in separate time intervals. At block 205, the processing logic of process 200 may identify one or more routines based on the collected sensor data using a selection criteria. For example, the collected sensor data may be compared to select a routine which maximizes processing performance, minimizes power usage, and/or satisfies other constraints or applicable criteria.

At block 207, the processing logic of process 200 can configure the processing hardware with the identified routines to perform the common task at block 207. The identified routines may be most suitable to perform the common task under the current operating environment of the processing hardware based on the selection criteria. In some embodiments, the identified routines may be activated or linked to an application interface layer in a software operating environment, such as in system 100 of FIG. 1, to support an API for performing the task.

Figure 3:
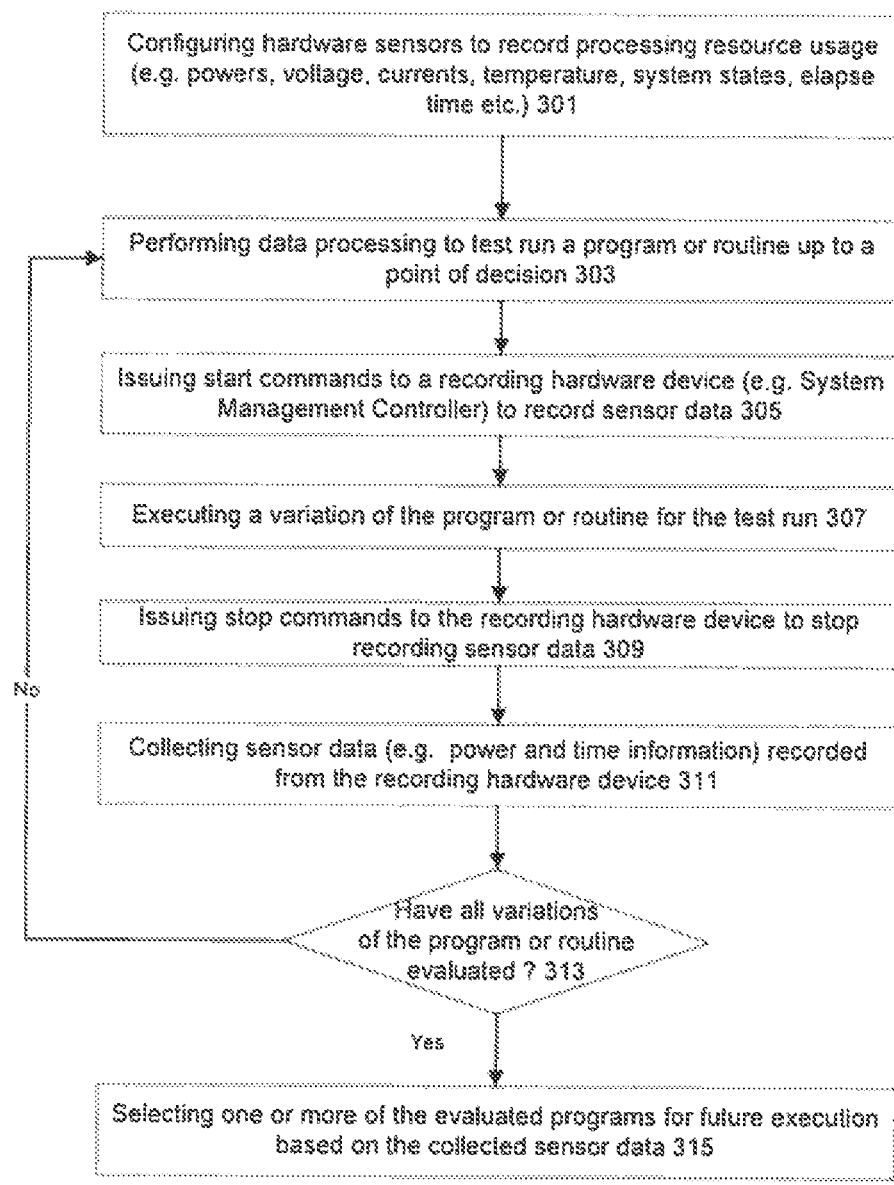
FIG. 3 is a flow diagram illustrating an embodiment of a process to select programs for future execution based on sensor data.

FIG. 3 is a flow diagram illustrating an embodiment of a process to select programs for future execution based on sensor data. Exemplary process 300 may be performed by a processing logic such as system 100 of FIG. 1. At block 301, according to one embodiment, processing logic of process 300 may configure hardware sensors to record processing resource usage. Hardware sensors may be capable of measuring or detecting physical attributes of the processing hardware such as powers, voltage, currents, temperature, system states, elapsed time or other applicable hardware measured data.

At block 303, the processing logic of process 300 can perform data processing operations dynamically (or in real time) to test run a program or routine up to a point of decision. For example, the point of decision may be a call to perform a task or function. Multiple executables may be available, such as in repository 111 of FIG. 1, to perform the same task. The processing logic of process 300 may actually test run each available executable to determine or decide which executable is most suitable under the current operating environment.

At block 305, the processing logic of process 300 can issue start commands to a recording hardware sensor control device, such as SMC controller device, to record sensor data. At block 307, the processing logic of process 300 can start executing one version of available program or routine for the test run. Each test run may be based on a common input (or test case). At block 309, the processing logic of process 300 can issue stop commands to the recording hardware device to stop recording sensor data.

At block 311, the processing logic of process 300 can collect sensor data (e.g. power, time or other applicable sensor information) recorded from the recording hardware device corresponding to a test run for one version of the available executables. If all variations of the program or routine have been evaluated at block 313, the processing logic of process 300 can select one or more of the evaluated programs (or variations of executables) for future execution to perform the same task based on the collected sensor data at block 315. Otherwise, the processing logic of process 300 can continue at block 303 for evaluating another available executable. The selection may be based on a selection criteria which may be preconfigured or dynamically configured.

Figure 4:
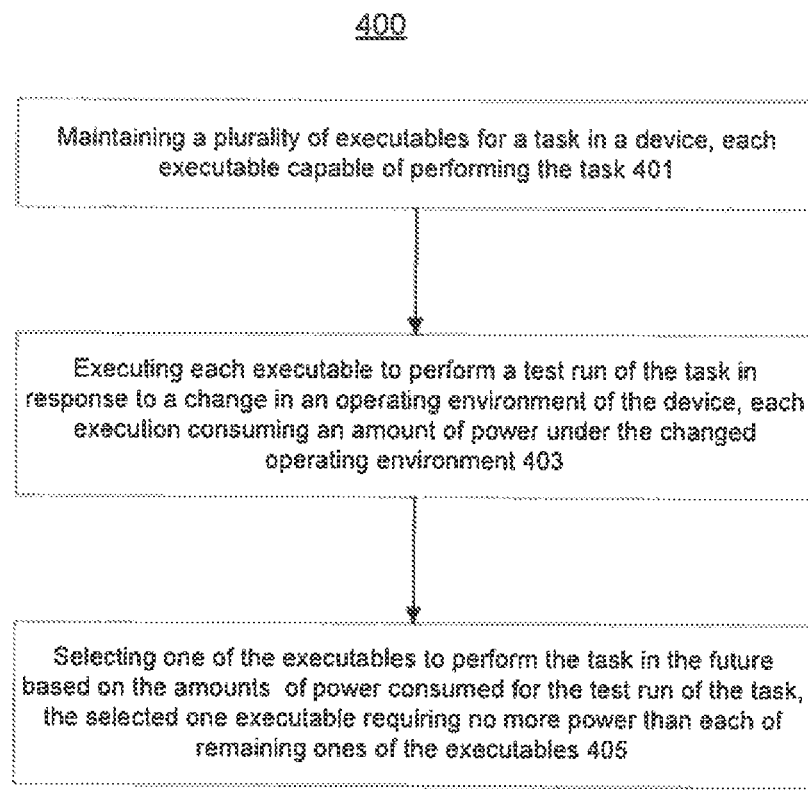
FIG. 4 is a flow diagram illustrating an embodiment of a process to select an executable to perform a task based on power consumption.

FIG. 4 is a flow diagram illustrating an embodiment of a process to select an executable to perform a task based on power consumption. Exemplary process 400 may be performed by a processing logic such as system 100 of FIG. 1. At block 401, according to one embodiment, processing logic of process 400 can maintain multiple executables, such as in repository 111 of FIG. 1, for a common task in a device. Each executable may be compiled to perform this common task.

For example, each executable may be compiled from a separate source code including instructions to perform this common task. Alternatively, or optionally, different executables may be automatically generated by a compiler with variations of instruction level optimization parameters. In one embodiment, the executables maintained can include at least one test input to perform the common task. The processing logic of process 400 can conduct test runs using the test input on the executables to perform this common task.

At block 403, the processing logic of process 400 can execute each executable (e.g. of the whole or a portion of available executables) to perform a test run of the task in response to a change detected in an operating environment of a device, such as a data processing hardware housing system 100 of FIG. 1. Each execution to test run the executables may consume an amount of power under the changed operating environment.

In one embodiment, a status of the operating environment may be monitored to detect the change which triggers the test run on the executables. The status may indicate whether the change has occurred. The processing logic of process 400 may determine dynamically whether to execute the executables to perform the test run of the task if the change has occurred.

In some embodiments, the operating environment may include hardware configurations specifying power sources, peripheral devices coupled, network connections, processor types, versions, multiple processor connections, and/or other applicable hardware related device information. The change can be caused by an update of the hardware configurations, such as when a graphics device is replaced, added, removed, a network card is attached/detached, an external power source become available/unavailable, or other applicable hardware changes. Optionally, the change may be caused by a drop/increase of power level of an existing power source below/above a certain threshold level.

In one embodiment, the operating environment may be associated with one or more software components loaded in a memory device of the data processing device supporting, for example, system 100 of FIG. 1. The change of the operating environment may be caused by an additional software component being loaded into the memory device or system. For example, the additional software component may include a driver of a hardware peripheral component (e.g. a network card, a graphics card etc). The drive may be loaded into the memory device according to an API (application programming interface) call from an application, for example to enable access to the corresponding hardware component.

In one embodiment, the additional software component loaded for the software operating environment may be linked with one of the executables to perform the common task. The additional software component may be executed (or called) via the linked executable when performing the common task. Thus, the change in the software operating environment may be caused by the availability of the additional software component to allow this common task to be performed in a different way.

In one embodiment, the operating environment, such as for system 100 of FIG. 1, may be initialized during power on of a corresponding hardware device. Software components may be loaded into the memory device to initialize the operating environment. The processing logic of process 400 may automatically perform evaluation test runs on the executables when the operating environment is initialized.

In one embodiment, the processing logic of process 400 can maintain an execution history (or record) specifying which inputs applied to perform a task via which one of the executables. These inputs may be provided or received from requests by customer applications for performing the task. The processing logic of process 400 may conduct evaluation test runs to select another executable for the task based on, for example, latest input (instead of test inputs prepared the executables). The results of the test runs using an actual input case may be more closely reflect a current required operating environment that using a prepared test case.

The processing logic of process 400 may collect sensor data during the execution of each executable for evaluation or test run the executable. The sensor data collected may indicate an amount of power used for the executable during the test run. In one embodiment, the execution to test run the executable may be performed during separate time intervals (e.g. processor time interval). Thus, multiple executables may be evaluated in parallel. The processing logic of process 400 may track separate amounts of power usage during the separate time intervals executing separate executables. The amount of power consumed for the execution of each executable may correspond to an aggregation (e.g. a sum) of the separate amounts of power usage tracked for the executable.

In one embodiment, a hardware sensor, such as power sensor, can measure separate amounts of resource usage, such as power usage, in a device for separate time intervals. A controller may keep track of end times (e.g. start time, stop times) of time intervals allocated for executing different executables in the device. The processing logic of process 400 may issue commands to start/stop the hardware sensor substantially when starting/concluding a test run of an executable. The controller may automatically record or keep track of end times of time intervals for sensor data collected from the hardware sensor where execution of the executable is not interrupted during the time intervals.

In some embodiments, the processing logic of process 400 can temporarily stop or pause test runs to evaluate executables when, for example, the device is busy performing data processing tasks of higher priority, such as user applications. The processing logic of process 400 can identify (or determine) when the device is idle to resume the previously paused test runs.

At block 405, the processing logic of process 400 can select one of the executables to perform the task in the future based on sensor data collected for the executables during evaluation test runs. For example, the sensor data may indicate amounts of power consumed for each test run to perform the same task via the executables. A selection criteria, such as minimum power consumption, may be used to select the one executable which consumed or required no more power than each of remaining ones of the executables during the test runs.

In one embodiment, the device includes an interface code to allow an application to send a request for performing a task via a API call to the interface code. The processing logic of process 400 may dynamically link or relink the interface code with the selected executable with the API to perform the task. Future requests received via the API may cause execution of the selected executable to perform the task.

Figure 5:
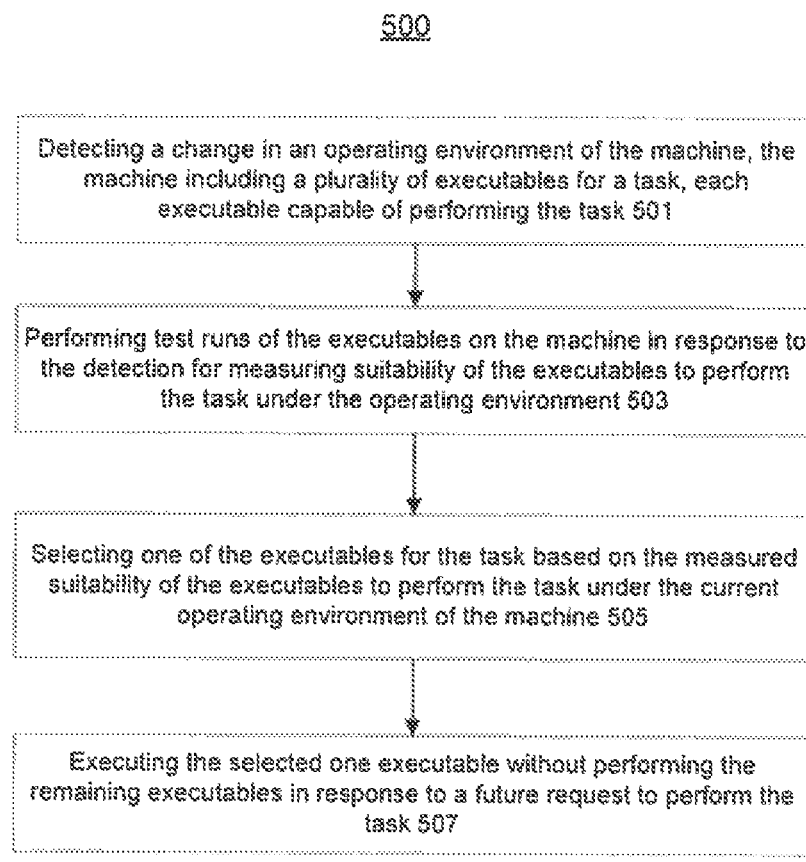
FIG. 5 is a flow diagram illustrating an embodiment of a process to detect a change in an operating environment to select an executable suitable for the operating environment.

FIG. 5 is a flow diagram illustrating an embodiment of a process to detect a change in an operating environment to select an executable suitable for the operating environment. Exemplary process 500 may be performed by a processing logic such as system 100 of FIG. 1. At block 501, according to one embodiment, the processing logic of process 500 may detect a change in an operating environment of the machine having multiple variations of executables to perform a task. Each executable is capable of separately performing the task.

At block 503, the processing logic of process 500 can conduct test runs of the executables in response to detecting a change in the operating environment. Test runs may be performed on the machine to measure or compare suitability of the executables to perform the task under the current operating environment which has just changed.

At block 505, the processing logic of process 500 can select one of the executables to perform the task in the future based on the measured suitability of the executables. At block 507, the processing logic of process 500 can execute the selected executable in response to a future request to perform the task without executing the remaining ones of the available executables.

Figure 6:
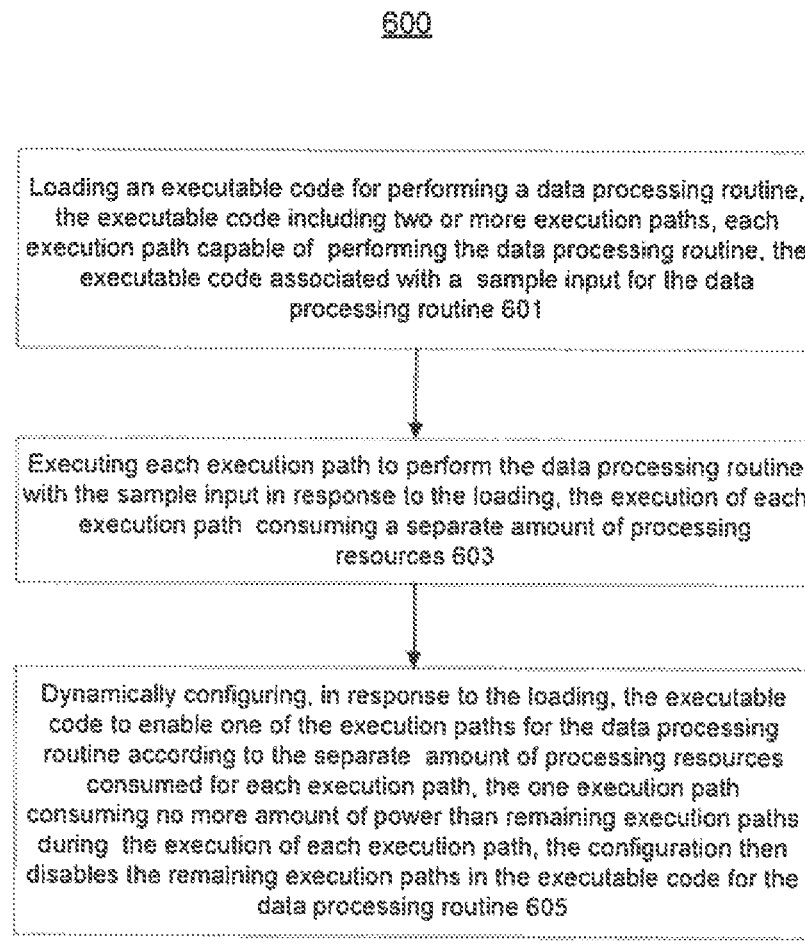
FIG. 6 is a flow diagram illustrating an embodiment of a process to execute execution paths within an executable to select one of the execution paths in response to loading of the executable code.

FIG. 6 is a flow diagram illustrating an embodiment of a process to execute execution paths within an executable to select one of the execution paths in response to loading of the executable code. Exemplary process 600 may be performed by a processing logic such as system 100 of FIG. 1. At block 601, according to one embodiment, the processing logic of process 600 can load an executable code for performing a data processing routine. The executable code may include multiple execution paths. Each execution path may be capable of performing or accomplishing the same data processing routine. The executable code may be associated with a sample input or a test case for the data processing routine. For example, the executable code may be packaged with the sample input.

At block 603, the processing logic of process 600 can iterate through each execution path to perform test runs of the data processing routine using the sample input. In one embodiment, the processing logic of process 600 may perform the test runs when the executable code is loaded (e.g. from a storage device to a memory as a library of an operating system). The test runs may indicate separate amounts of processing resources consumed during the execution of each execution path for the test runs.

At block 605, the processing logic of process 600 can dynamically configure the executable code to enable one of the execution paths to perform the data processing routine in the future, according to, for example, separate amount of processing resources consumed during the test run for each execution path. In one embodiment, the configured or selected execution path may consume the least amount of processing resources among possible execution paths for the data process routine in the executable code. The configuration may disable the remaining execution paths in the executable code for the data processing routine.

Figure 7:
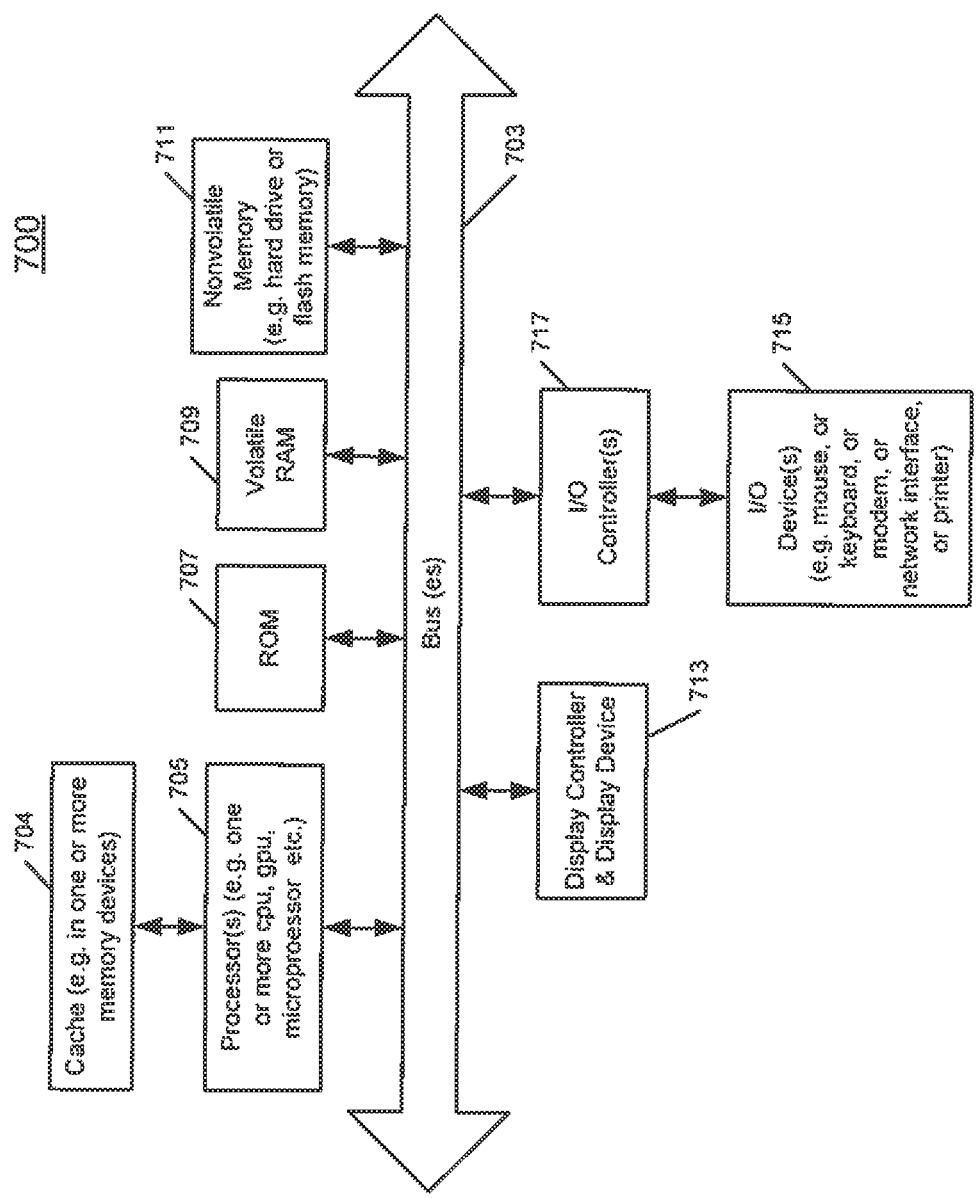
FIG. 7 illustrates one example of a typical computer system which may be used in conjunction with the embodiments described herein.

FIG. 7 shows one example of a data processing system which may be used with one embodiment of the present invention. For example, the system 700 may be implemented including a host as shown in FIG. 1. Note that while FIG. 7 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 7, the computer system 700, which is a form of a data processing system, includes a bus 703 which is coupled to a processor(s) 705 and a ROM (Read Only Memory) 707 and volatile RAM 709 and a non-volatile memory 711. Processors 705 may include one or more application processors, microprocessors, graphic processors (GPU) or other applicable processors. The processor 705 may retrieve the instructions from the memories 707, 709, 711 and execute the instructions to perform operations described above. The bus 703 interconnects these various components together and also interconnects these components 705, 707, 709, and 711 to a display controller and display device 713 and to peripheral devices such as input/output (I/O) devices which may be mice, keyboards, modems, network interfaces, printers and other devices which are well known in the art. Typically, the input/output devices 715 are coupled to the system through input/output controllers 717. The volatile RAM (Random Access Memory) 709 is typically implemented as dynamic RAM (DRAM) which requires power continually in order to refresh or maintain the data in the memory.

The mass storage 711 is typically a magnetic hard drive or a magnetic optical drive or an optical drive or a DVD RAM or a flash memory or other types of memory systems which maintain data (e.g. large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 703 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A data processing system comprising:
   a processing system;
   a memory coupled to the processing system, the memory comprising a machine-readable non-transitory storage medium having instructions therein, which when executed by the processing system, cause the processing system to perform a method, the method comprising:
   detecting a change in an operating environment of the data processing system, wherein the data processing system includes a plurality of executables for a task, each executable capable of performing the task;
   in response to the change detected, performing one or more runs of the executables on the data processing system for measuring suitability of the executables to perform the task under the operating environment;
   selecting one of the executables for the task based on the measured suitability for the task under the operating environment of the data processing system; and
   in response to a future request to perform the task, executing the selected one executable without performing the remaining executables.

2. The system of claim 1, wherein the executables include at least one test input for the task, and wherein the one or more runs of the task are performed based on the one test input.

3. The system of claim 1, the method further comprising:
   monitoring a status of the operating environment, wherein the status indicates whether the change has occurred; and
   determining dynamically whether to execute the executables to perform the one or more runs of the task if the change has occurred.

4. The system of claim 3, wherein the operating environment includes a hardware configuration and wherein the change is caused by a change of the hardware configuration.

5. The system of claim 4, wherein the change in hardware configuration includes a change in one or more network interconnects or a change in power source or power level.

6. The system of claim 3, wherein the operating environment is associated with one or more software components in the data processing system, and wherein the change is caused by a change of one or more software components.

7. The system of claim 6, wherein the one or more software components includes a driver of a hardware device and wherein the driver is loaded into the memory according to an API (application programming interface) call from an application.

8. The system of claim 3, wherein the determining dynamically comprises:
   determining when the processing system is idle and wherein the execution of each executable for performing the one or more test runs of the task occurs when the device is idle.

9. The system of claim 1, wherein the measured suitability comprises one of:
   power consumption, memory usage, elapsed time, processing speed, or temperature.

10. A data processing system comprising:
    a processing system;
    a memory coupled to the processing system, the memory comprising a machine-readable non-transitory storage medium having instructions therein, which when executed by the data processing system, cause the data processing system to perform a method, the method comprising:
    loading an executable code for performing a data processing routine, the executable code including two or more execution paths, each execution path capable of performing the data processing routine, the executable code associated with a sample input for the data processing routine;
    after the loading, executing each execution path to perform the data processing routine with the sample input, the execution of each execution path consuming a separate amount of power; and
    dynamically configuring, the executable code to enable one of the execution paths for the data processing routine according to the separate amount of power consumed for each execution path, the one execution path consuming no more amount of power than remaining execution paths during the execution of each execution path, the configuration disabling the remaining execution paths in the executable code for the data processing routine.

11. The system of claim 10 wherein the dynamically configuring occurs in response to a change of an operating environment of the data processing system.

12. The system of claim 11, the method further comprising:
monitoring a status of the operating environment, wherein the status indicates whether the change has occurred; and
determining dynamically whether to execute each execution path to perform the data processing routine with the sample input if the change has occurred.

13. The system of claim 12, wherein the operating environment includes a hardware configuration and wherein the change is caused by a change of the hardware configuration.

14. The system of claim 13, wherein the change in hardware configuration includes a change in one or more network interconnects or a change in power source or power level.

15. The system of claim 12, wherein the operating environment is associated with one or more software components in the data processing system, and wherein the change is caused by a change of one or more software components in the data processing system.

16. The system of claim 15, wherein the one or more software components includes a driver of a hardware device and wherein the driver is loaded into the memory according to an API (application programming interface) call from an application.

17. The system of claim 16, wherein the operating environment is initialized during power on of the data processing system.

18. The system of claim 12, wherein the determining dynamically comprises:
determining when the device is idle and wherein the execution of each executable path occurs when the device is idle.

19. A machine implemented method comprising:
detecting a change in an operating environment of the machine, wherein the machine includes a plurality of executables for a task, each executable capable of performing the task;
in response to the change detected, performing one or more test runs of the executables on the machine for measuring suitability of the executables to perform the task under the operating environment;
selecting one of the executables for the task based on the measured suitability for the task under the operating environment of the machine; and
in response to a future request to perform the task, executing the selected one executable without performing the remaining executables.

20. A machine implemented method comprising:
loading an executable code for performing a data processing routine, the executable code including two or more execution paths, each execution path capable of performing the data processing routine, the executable code associated with a sample input for the data processing routine; after the loading, executing each execution path to perform the data processing routine with the sample input on the machine, the execution of each execution path consuming a separate amount of power; and
dynamically configuring the executable code to enable one of the execution paths for the data processing routine according to the separate amount of power consumed for each execution path, the one execution path consuming no more amount of power than remaining execution paths during the execution of each execution path, the configuration disabling the remaining execution paths in the executable code for the data processing routine.

21. The method of claim 20 wherein the dynamically configuring occurs in response to a change of an operating environment of the machine.

22. The method of claim 21, the method further comprising:
monitoring a status of the operating environment;
dynamically determining whether to execute each execution path to perform the data processing routine with the sample input.

* * * * *